United States Patent
Boggia et al.

(10) Patent No.: US 11,283,854 B2
(45) Date of Patent: Mar. 22, 2022

(54) METHOD AND SYSTEM FOR PROVIDING VARIABLE QUALITY STREAMING VIDEO SERVICES IN MOBILE COMMUNICATION NETWORKS

(71) Applicant: TELECOM ITALIA S.p.A., Milan (IT)

(72) Inventors: Gennaro Boggia, Conversano (IT); Pietro Camarda, Bari (IT); Marco Caretti, Turin (IT); Roberto Fantini, Turin (IT); Luigi Alfredo Grieco, Bari (IT); Bruno Melis, Turin (IT); Giuseppe Piro, Matera (IT)

(73) Assignee: TELECOM ITALIA S.p.A., Milan (IT)

( * ) Notice: Subject to any disclaimer, the term of this patent is extended or adjusted under 35 U.S.C. 154(b) by 113 days.

(21) Appl. No.: 16/468,564

(22) PCT Filed: Dec. 27, 2016

(86) PCT No.: PCT/EP2016/082708
§ 371 (c)(1),
(2) Date: Jun. 11, 2019

(87) PCT Pub. No.: WO2018/121839
PCT Pub. Date: Jul. 5, 2018

(65) Prior Publication Data
US 2020/0084254 A1    Mar. 12, 2020

(51) Int. Cl.
*H04L 29/06* (2006.01)
*H04N 21/2343* (2011.01)
(Continued)

(52) U.S. Cl.
CPC .......... *H04L 65/80* (2013.01); *H04L 65/4084* (2013.01); *H04L 65/602* (2013.01);
(Continued)

(58) Field of Classification Search
CPC ... H04L 65/80; H04L 65/4084; H04L 65/602; H04L 65/608; H04N 21/23439; H04N 21/8456
See application file for complete search history.

(56) References Cited

U.S. PATENT DOCUMENTS 8,804,508 B1 * 8/2014 Hobbs .............. H04N 21/64769
370/230
10,104,141 B2 * 10/2018 Muhlestein ............. H04L 65/60
(Continued)

FOREIGN PATENT DOCUMENTS

EP        2 696 552 A1    2/2014
WO    WO 2014/158264 A1    10/2014

OTHER PUBLICATIONS

International Search Report and Written Opinion dated Sep. 18, 2017 in PCT/EP2016/082708 filed Dec. 27, 2016.

*Primary Examiner* — Esther B. Henderson
*Assistant Examiner* — Nazia Naoreen
(74) *Attorney, Agent, or Firm* — Oblon, McClelland, Maier & Neustadt, L.L.P.

(57) ABSTRACT

A method of downloading a multimedia content from a content server to a client through a wireless communication network is provided. The multimedia content is subdivided into a plurality of chunks and for each chunk the content server has at least two corresponding versions thereof encoded with different encoding rates. The method includes having the client send a first request of a first version of a corresponding requested chunk, and having a proxy server intercept the first request to generate a second request of a second version of the requested chunk. The method also includes having the proxy server send the second request to the content server in place of the first request, and having the content server send the second version to the client. The (Continued)

second request is generated based on the amount of information content of the versions of said requested chunk.

11 Claims, 5 Drawing Sheets

(51) Int. Cl.
    *H04N 21/845* (2011.01)
    *H04L 65/80* (2022.01)
    *H04L 65/612* (2022.01)
    *H04L 65/60* (2022.01)
    *H04L 65/65* (2022.01)

(52) U.S. Cl.
    CPC ..... *H04L 65/608* (2013.01); *H04N 21/23439* (2013.01); *H04N 21/8456* (2013.01)

(56) References Cited

U.S. PATENT DOCUMENTS

| | | |
|---|---|---|
| 2014/0036656 A1 | 2/2014 | Chou et al. |
| 2014/0036664 A1 | 2/2014 | Han et al. |
| 2014/0036769 A1 | 2/2014 | Stojanovski et al. |
| 2014/0036792 A1 | 2/2014 | Li et al. |
| 2014/0036793 A1 | 2/2014 | Johnsson et al. |
| 2014/0036794 A1 | 2/2014 | Koc et al. |
| 2014/0036795 A1 | 2/2014 | Martinez Tarradell et al. |
| 2014/0036796 A1 | 2/2014 | Etemad et al. |
| 2014/0036876 A1 | 2/2014 | Li et al. |
| 2014/0038623 A1 | 2/2014 | Davydov et al. |
| 2014/0040498 A1 | 2/2014 | Oyman et al. |
| 2014/0040504 A1 | 2/2014 | Gupta |
| 2014/0047071 A1* | 2/2014 | Shehada ............. H04L 65/4084 709/219 |
| 2014/0112300 A1 | 4/2014 | Han et al. |
| 2014/0189143 A1 | 7/2014 | Muhlestein |
| 2014/0293842 A1 | 10/2014 | He et al. |
| 2014/0293890 A1 | 10/2014 | Davydov et al. |
| 2014/0293988 A1 | 10/2014 | Han et al. |
| 2014/0295849 A1 | 10/2014 | Sirotkin |
| 2014/0341048 A1 | 11/2014 | Sajadieh et al. |
| 2015/0139197 A1 | 5/2015 | He et al. |
| 2015/0139292 A1 | 5/2015 | Shirani-Mehr et al. |
| 2015/0146532 A1 | 5/2015 | Stojanovski et al. |
| 2015/0156702 A1 | 6/2015 | Stojanovski et al. |
| 2015/0181564 A1 | 6/2015 | Rao et al. |
| 2015/0189521 A1 | 7/2015 | Chou et al. |
| 2015/0189591 A1 | 7/2015 | Koc et al. |
| 2015/0200718 A1 | 7/2015 | Sajadieh et al. |
| 2015/0201375 A1 | 7/2015 | Vannithamby et al. |
| 2015/0305077 A1 | 10/2015 | Johnsson et al. |
| 2015/0334157 A1* | 11/2015 | Oyman ................ H04W 24/04 709/219 |
| 2015/0382365 A1 | 12/2015 | Li et al. |
| 2016/0007216 A1 | 1/2016 | Chou et al. |
| 2016/0007346 A1 | 1/2016 | Sirotkin et al. |
| 2016/0014184 A1 | 1/2016 | Rehan et al. |
| 2016/0014632 A1 | 1/2016 | Siow et al. |
| 2016/0014836 A1 | 1/2016 | Pinheiro et al. |
| 2016/0020843 A1 | 1/2016 | Li et al. |
| 2016/0021606 A1 | 1/2016 | Gupta |
| 2016/0029249 A1 | 1/2016 | Chou |
| 2016/0050246 A1 | 2/2016 | Liao et al. |
| 2016/0100384 A1 | 4/2016 | Etemad et al. |
| 2016/0100441 A1 | 4/2016 | Li et al. |
| 2016/0192408 A1 | 6/2016 | Martinez Tarradell et al. |
| 2017/0070900 A1 | 3/2017 | Chou et al. |
| 2017/0094025 A1 | 3/2017 | Gupta |
| 2017/0111898 A1 | 4/2017 | Han et al. |
| 2018/0234518 A1* | 8/2018 | Zhu ...................... H04W 76/14 |

\* cited by examiner

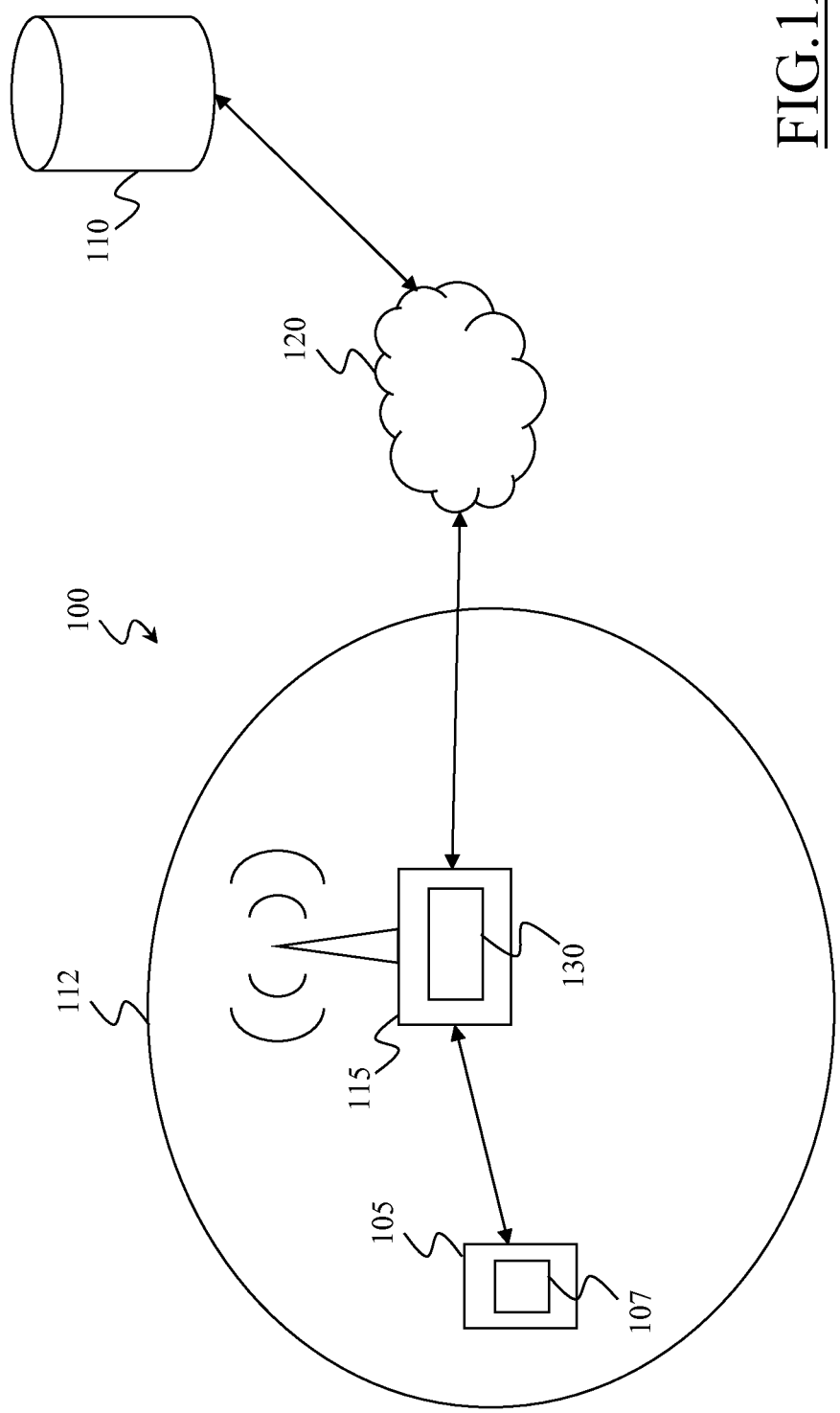

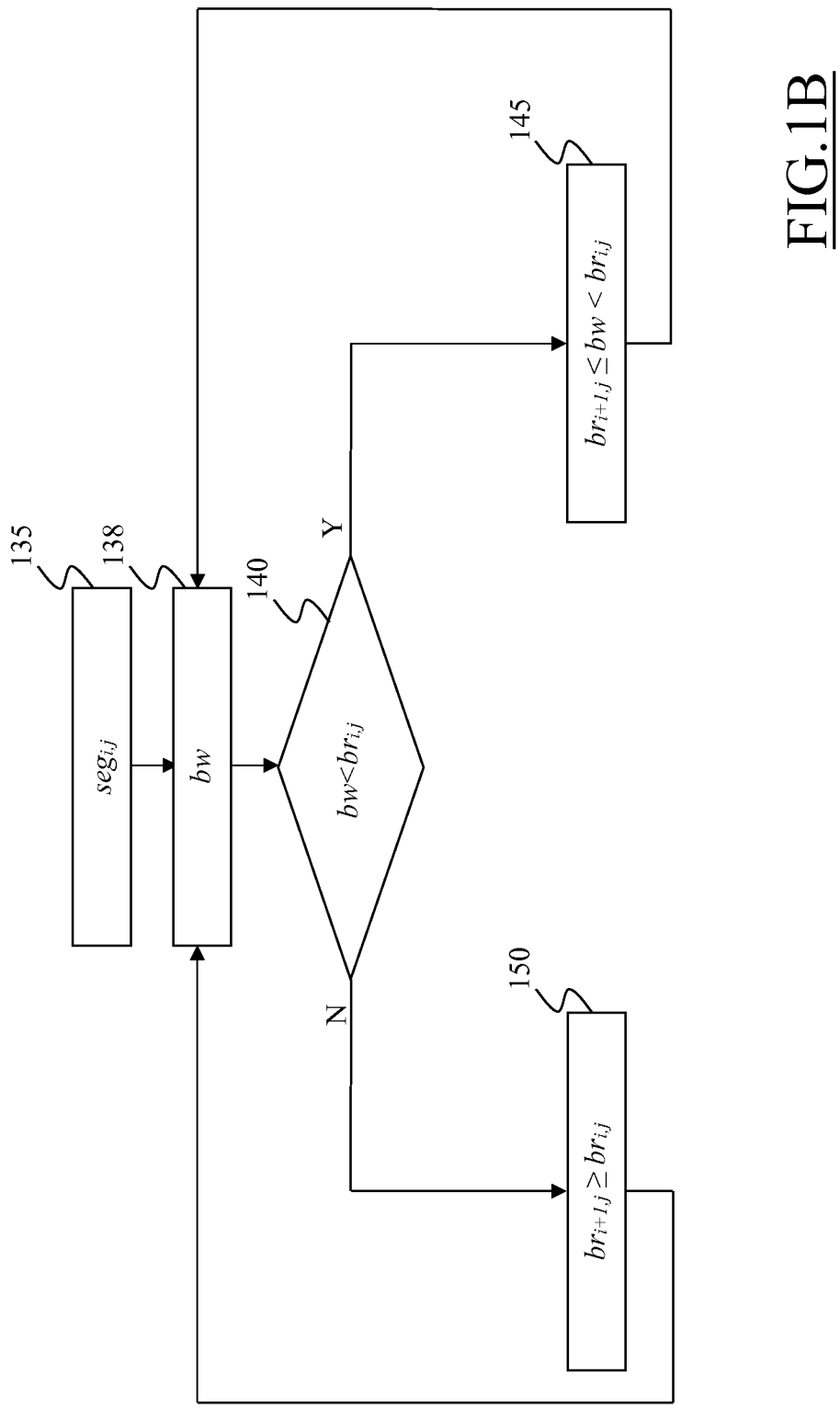

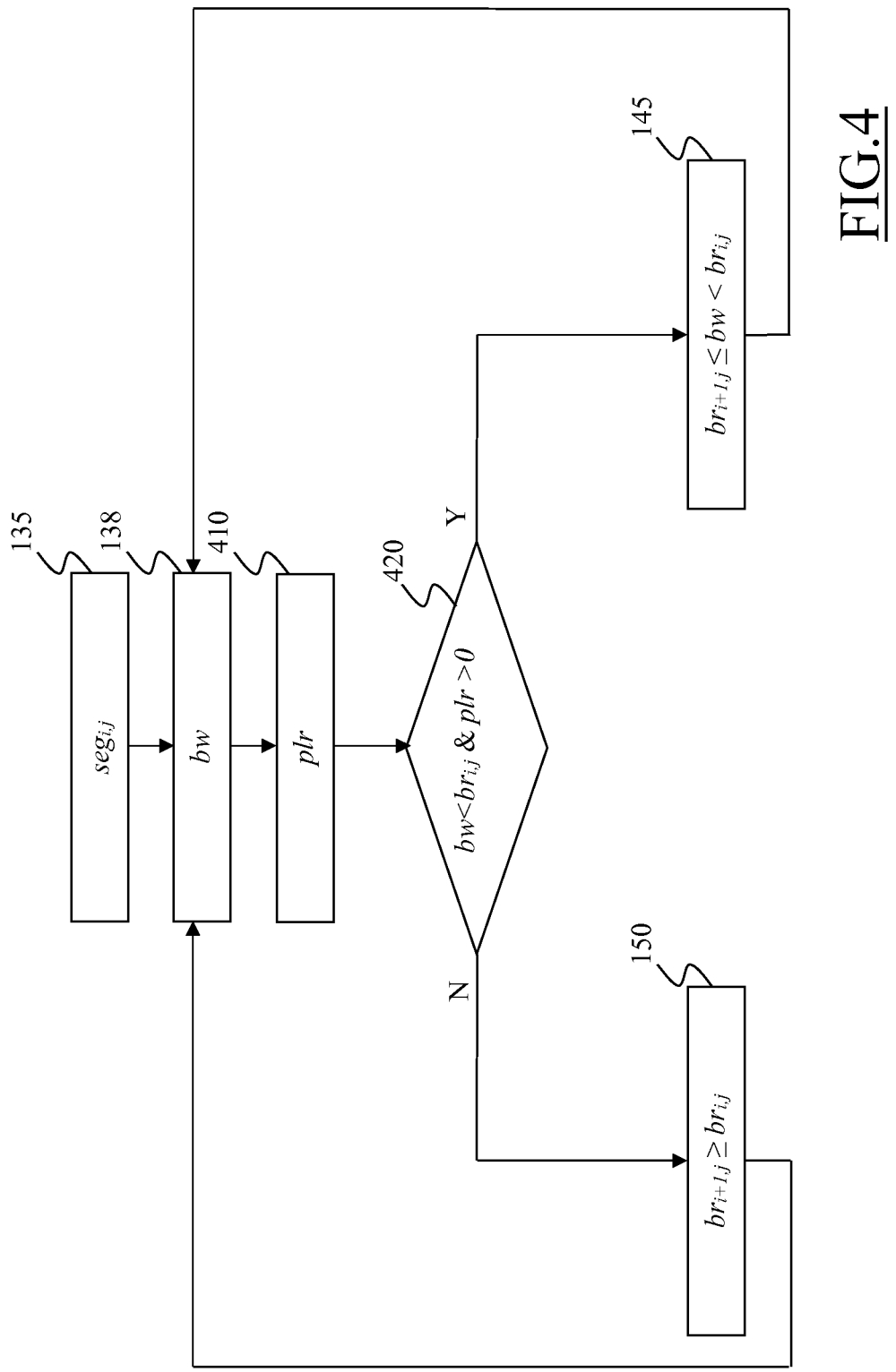

METHOD AND SYSTEM FOR PROVIDING VARIABLE QUALITY STREAMING VIDEO SERVICES IN MOBILE COMMUNICATION NETWORKS

BACKGROUND OF THE INVENTION

Field of the Invention

The present invention refers to communication systems. More particularly, the present invention relates to the field of wireless or mobile telecommunication networks. Even more particularly, the present invention relates to the rate control of streams of multimedia contents for streaming services in a wireless communication network.

Overview of the Related Art

Streaming services, such as video delivery, i.e., services in which a multimedia content (e.g., a multimedia file, such as a video recording or video clip) is constantly received by and presented to an end user, while being delivered by a provider of the streaming service, are already widely popular and are expected to become dominant in current and next generation wireless communication networks, particularly in cellular systems, mainly thanks to the increment in the network available bandwidth, for example allowed by both Long Term Evolution (LTE) and Long Term Evolution Advanced (LTE-A) standards for mobile telephony networks.

Unfortunately, even in large-bandwidth (i.e., broadband) wireless communication networks (such as LTE/LTE-A networks), it could be difficult to offer a satisfactory Quality of Service (QoS) level during the provision of the streaming service without adopting ad hoc optimization strategies.

Indeed, in any wireless communication network, a user may experience a fluctuation in time of the available bandwidth, which may be due to the variation of both the channel quality and the traffic load. Such a fluctuation may significantly influence the quality of the offered service, especially for streaming services, thus causing interruption or lagging in the provision of the multimedia content.

In the art, in order to cope with this issue, the concept of scalable multimedia content (e.g., scalable video) has been conceived for adapting the multimedia content to a variable available transmission rate. For example, in the case of a video multimedia content, the quality of a video stream may be adapted according to the amount of bandwidth available for a given user wishing to enjoy the video. This approach has been highly exploited in several solutions based on the video compression format H.264/MPEG-4 Part 10 or Advanced Video Coding (AVC) with the Scalable Video Coding (SVC) extension, Fine Grained Scalability (FGS), hierarchical, and Multiple Description Coding (MDC) encoding schemes.

More recently the Dynamic Adaptive Streaming over HTTP (DASH) standard, also known as MPEG-DASH, has been developed. The MPEG-DASH standard defines a client-server architecture configured for delivering scalable (mainly video) multimedia contents through HTTP (Hyper Text Transfer Protocol). According to the MPEG-DASH standard, each multimedia content is divided in chunks of fixed or variable (i.e., different from chunk to chunk) length. Each multimedia content chunk is associated with a plurality of multimedia content segments (also simply referred to as "segments") available within the remote server, which is configured to provide the streaming services (e.g., a server of a provider of streaming services). Each segment associated with a same multimedia content chunk comprises the same portion of the multimedia content, but each of the multimedia content segments is a version of the multimedia content portion encoded with a specific encoding rate, e.g., a specific frame rate in the case of a video (therefore, the multimedia content segments associated with the same multimedia content chunk have a different size, expressed in number of bits, one from the other). For a given multimedia content, a list of its chunks, associated multimedia content segments and their storage location inside the server (e.g., expressed through a plurality of Universal Resource Locators—URLs), encoding rates, and other parameters associated with the multimedia content are organized according to a so-called Media Presentation Description (MPD) file stored in the server.

In order to access the streaming service and receive a (desired) multimedia content, the end user (to be intended by means of a user equipment such as a personal computer, a smartphone, a tablet and the like) has to obtain the MPD file first. The MPD file can be delivered by the server to the end user via HTTP, email, or by similar data transmission mechanisms. Once the end user has obtained the MPD file, the user can send to the server a request for receiving segments (of different chunks) of the multimedia content. Moreover, during the reception of the multimedia content, the user can estimate the available transmission bandwidth and request to the server the most suitable (in terms of number of bits) segments of each chunk listed within the MPD.

Applicant has developed a rate adaption algorithm compliant with the MPEG-DASH standard, which is configured to be handled at the client side. On this regard, international patent application WO 2016/102001 (filed by the same applicant) discloses a method for downloading a multimedia content from a server to a client through a wireless communication network. The multimedia content is subdivided into a plurality of portions and for each portion the server stores a plurality of versions thereof each of which is encoded with a specific encoding quality. The method comprises: selecting, among the plurality of versions of each portion of the multimedia content, a version of said portion of the multimedia content to be downloaded on the basis of wireless communication parameters determined at least two different layers of a wireless communication network OSI protocol stack at the client.

European patent application EP 2696552 discloses a method for transmitting multimedia data to a plurality of clients over a network. The multimedia data is stored in a plurality of formats of different multimedia rates. The method comprises, on the basis of utility information for the multimedia data, the utility information describing a relationship between multimedia quality and multimedia rate, and on the basis of a condition of the network, determining for each of the plurality of clients available multimedia rates for the multimedia data. The method further comprises, in response to a client request for transmitting the multimedia data with a desired multimedia rate, selecting, in accordance with the available multimedia rates determined for the requesting client, a format of the requested multimedia data and transmitting the multimedia data in the selected format to the requesting client.

US patent application US 2013/0007814 discloses techniques for a dynamic adaptive streaming proxy for unicast or broadcast/multicast service. For example, a method for controlling an encoding format of multimedia content for a multimedia client of a wireless communications network (WCN) includes modifying, at a proxy component of the WCN network entity, a data structure that associates one or more different locators for multimedia content with respective different encoding formats for the multimedia content, to obtain a modified data structure. The method may include controlling an encoding format for the multimedia content provided to at least one multimedia client, at least in part by the modified data structure.

International patent application WO 2014/062921 discloses a multi-hypothesis rate adaptation technique which may be performed for one or more wireless multimedia streaming scenarios. Managing a multimedia streaming session may involve sending, by a client, a request for a first portion of content to a server. A response may be received from a proxy. The response may comprise the first portion of content and information associated with a second portion of content available via the proxy. A request may be sent to the proxy for the proxy to deliver the second portion of content to the client. A change in a parameter associated with the multimedia streaming session may be determined based on data received from the proxy. It may be determined to change a rate adaptation. A Wireless Transmit/Receive Unit (WTRU) may be configured to perform the rate adaptation.

Paper "Video adaptation proxy for wireless dynamic adaptive streaming over HTTP" by Wei Pu, Zixuan Zou, Chang Wen Chen, *International Packet Video Workshop*, Munich, May 2012, relates to Dynamic Adaptive Streaming over HTTP (DASH) in cellular broadband access networks (e.g., HSDPA, HSPA+, LTE). A wireless DASH (WiDASH) proxy is proposed to enhance the Quality-of-Experience (QoE) of wireless DASH. WiDASH proxy locates at the edge between Internet and wireless core networks. Different from conventional DASH, whose rate adaptation logics are either implemented locally in the user equipment or in the DASH server, WiDASH proxy is in charge of video adaptation, which makes it feasible to perform global optimization over multiple concurrent DASH flows. WiDASH simultaneously explores the potential of both split TCP and parallel TCP. It splits the original TCP connection from DASH server to a wireless user into one wired TCP and multiple wireless TCPs. This approach is able to increase video streams' average throughput without sacrificing inter user fairness. WiDASH proxy employs video quality aware dynamic prioritization. Low bit rate video streams are entitled with high priority to guarantee minimum QoE for users with bad wireless channel quality. A video stream's priority is gradually dropped to normal state with the growth of its bit rate so that inter flow fairness between video streams and background best effort flows are still maintained. Third, a multiple-input multiple-output adaptive optimal controller is provided, based on adaptive control theory. This rate controller minimizes a quadratic cost function which is defined as the weighted sum of multiple concurrent DASH videos' distortion, bit rate variation, and playback jitter. The solution of the optimization problem implicitly coordinates multiple DASH streams to improve overall streaming QoE. Simulation results verify that WiDASH proxy is able to improve QoE by providing smoother video streams with higher average visual quality for wireless HTTP video streaming.

Paper "Proxy-Based Multi-Stream Scalable Video Adaptation Over Wireless Networks Using Subjective Quality and Rate Models" by Hao Hu, Xiaoqing Zhu, Yao Wang, Rong Pan, Jiang Zhu, Bonomi F, *IEEE Transactions on Multimedia*, Volume: 15, Issue 7, 4 Jun. 2013, discloses a proxy-based solution for adapting the scalable video streams at the edge of a wireless network, which can respond quickly to highly dynamic wireless links. This solution adopts the recently standardized scalable video coding (SVC) technique for lightweight rate adaptation at the edge. Leveraging previously developed rate and quality models of scalable video with both temporal and amplitude scalability, the rate-quality model relating to the maximum quality under a given rate have been derived by choosing the optimal frame rate and quantization stepsize. The proxy iteratively allocates rates of different video streams to maximize a weighted sum of video qualities associated with different streams, based on the periodically observed link throughputs and the sending buffer status. The temporal and amplitude layers included in each video are determined to optimize the quality while satisfying the rate assignment.

Paper "QoE-Driven Cross-Layer Optimization for Wireless Dynamic Adaptive Streaming of Scalable Videos Over HTTP" by Mincheng Zhao, Xiangyang Gong, Jie Liang, Wendong Wang, Xirong Que, Shiduan Cheng, *IEEE Transactions on Circuits and Systems for Video Technology*, Volume 25, Issue: 3, 12 Sep. 2014, discloses three methods to enhance the quality of experience of wireless DASH users. An improved mapping scheme has been designed from scalable video coding layers to DASH layers that can provide desired bitrates, enhance video end-to-end throughput, and reduce HTTP communication overhead. A DASH-friendly scheduling and resource allocation algorithm has been developed by integrating the DASH-based media delivery and the radio-level adaptation via a cross-layer approach. It utilizes the characteristics of video content and scalable video coding, and greatly reduces the possibility of video playback interruption by considering the client buffer status. The optimization problem is formulated as a mixed binary integer programming problem, and is solved by a subgradient method. A DASH proxy-based bitrate stabilization algorithm is also proposed to improve the video playback smoothness that can achieve the desired tradeoff between playback quality and stability.

Paper "Comparison of DASH adaptation strategies based on bitrate and quality signalling" by Francesca De Simone and Frederic Dufaux, *Multimedia Signal Processing (MMSP)*, 2013 IEEE 15th International Workshop, 30 Sep. 2013, discloses a comparative analysis of different adaptation strategies for representation switching, which exploit information on the bitrate and the visual quality of the different available versions of the requested content, at representation or at segment level. The results allow to identify the advantages and drawbacks related to each strategy in terms of bandwidth exploitation, maximization of visual quality and risk of buffer underflow.

SUMMARY OF THE INVENTION

The Applicant has found that the known solutions mentioned above are not satisfactory, entailing a sub-optimal bandwidth usage which cannot be controlled by the operator of the wireless network.

Applicant has found that if a proxy server is provided at the base stations, which optimizes requests of multimedia portions based on the information content of such portions, the problems of the prior art solutions can be efficiently overcame.

An aspect of the present invention relates to a method of downloading a multimedia content from a content server to a client through a wireless communication network. The multimedia content is subdivided into a plurality of chunks and for each chunk the content server has at least two corresponding versions thereof encoded with different encoding rates. The method comprises having the client send a first request of a first version of a corresponding requested chunk; having a proxy server intercept said first request to generate a second request of a second version of the requested chunk; having the proxy server send such second request to the content server in place of said first request; and having the content server send the second version to the client. Said second request is generated based on the amount of information content of the versions of said requested chunk.

According to an embodiment of the present invention, the method further comprises generating said second request by carrying out the following sequence of operations:
  selecting a collection of encoding rates among the encoding rates of the versions of said requested chunk which are stored in the content server, each encoding rate of the selected collection being such that the difference between:
    a) the video quality of the first version, and
    b) the video quality of the version of the requested chunk encoded with said encoding rate of the selected collection,
  is lower than a threshold;
  selecting the lowest encoding rate among the encoding rates of the collection, and
  selecting the version of the requested chunk encoded with said selected lowest encoding rate as the second version.

According to an embodiment of the present invention, said threshold corresponds to a maximum tolerated quality degradation introduced by using the second version in place of the corresponding first version.

According to an embodiment of the present invention, said video quality of a version of a chunk is assessed by exploiting one among the following objective metrics:
  the peak signal-to noise ratio;
  the average structural similarity, and
  perceptual evaluation of video quality.

According to an embodiment of the present invention, said video quality of a version of a chunk is assessed by exploiting the peak signal-to noise ratio and said threshold has a value that ranges from 1 dB to 10 dB.

According to an embodiment of the present invention, the method further comprises dynamically adapting the value of such threshold based on the actual traffic load condition of the wireless communication network.

According to an embodiment of the present invention, the versions of a chunk stored in the content server are encoded with encoding rates that cause such versions to have quality levels uniformly distributed between a first MOS index and a second MOS index.

According to an embodiment of the present invention, said having the client send a first request of a first version of a corresponding requested chunk comprises:
  having the client measure the amount of data received in response to the reception of a version of a previous chunk;
  having the client measure the packet loss ratio of such reception;
  having the client select such first version based on said measured amount of data and based on said measured packet loss ratio.

According to an embodiment of the present invention, said having the client select such first version based on said measured amount of data and based on said measured packet loss ratio comprises:
  if the measured amount of data is lower than the encoding rate of said version of a previous chunk, and, at the same time, if the measured packet loss ratio is higher than zero:
    selecting said first version in such a way that said first version is a version of the requested chunk which is encoded with an encoding rate lower than the encoding rate of said version of a previous chunk,
  if the measured amount of data is equal to or higher than the encoding rate of said version of a previous chunk, or if the measured packet loss ratio is equal to or lower than zero:
    selecting said first version in such a way that said first version is a version of the requested chunk which is encoded with an encoding rate equal to or higher than the encoding rate of said version of a previous chunk.

Another aspect of the present invention relates to a wireless communication network. The wireless communication network comprises a user equipment on which runs a client, and at least one radio communication station adapted to manage wireless communication between said client and a content server for downloading a multimedia content. Said multimedia content is subdivided into a plurality of chunks and for each chunk the content server has at least two corresponding versions thereof encoded with different encoding rates. The client is configured to send a first request of a first version of a corresponding requested chunk. The at least one radio communication station hosts a proxy server configured to intercept said first request to generate a second request of a second version of the requested chunk, and configured to send such second request to the content server in place of said first request. The content server is configured to send the second version to the client. Said second request is generated based on the amount of information content of the versions of said requested chunk.

According to an embodiment of the present invention, the proxy server is configured to generate said second request by carrying out the following sequence of operations:
  selecting a collection of encoding rates among the encoding rates of the versions of said requested chunk which are stored in the content server, each encoding rate of the selected collection being such that the difference between:
    a) the video quality of the first version, and
    b) the video quality of the version of the requested chunk encoded with said encoding rate of the selected collection,
  is lower than a threshold;
  selecting the lowest encoding rate among the encoding rates of the collection, and
  selecting the version of the requested chunk encoded with said selected lowest encoding rate as the second version.

Another aspect of the present invention relates to a proxy server adapted to be hosted at a radio communication station of a wireless communication network. The radio communication station is adapted to manage wireless communication between a client running on a user equipment and a content server for downloading a multimedia content. Said multimedia content is subdivided into a plurality of chunks and for each chunk the content server has at least two corresponding versions thereof encoded with different encoding rates. The proxy server is configured to intercept a first request coming from the client and directed to the content server. Such first request is a request of a first version of a corresponding requested chunk. The proxy server is further configured to generate a second request of a second version of the requested chunk, and send such second request to the content server in place of said first request. Said second request is generated based on the amount of information content of the versions of said requested chunk.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 1A is a principle schematic of a wireless communication network in which a user equipment connects to a content server for requesting a streaming service;

FIG. 1B is a flow chart illustrating the main operations of an exemplary rate control algorithm carried out by the client of FIG. 1A;

FIG. 4 is a flow chart illustrating the rate control algorithm of FIG. 1B modified according to an embodiment of the present invention.

DETAILED DESCRIPTION

Figure 2:
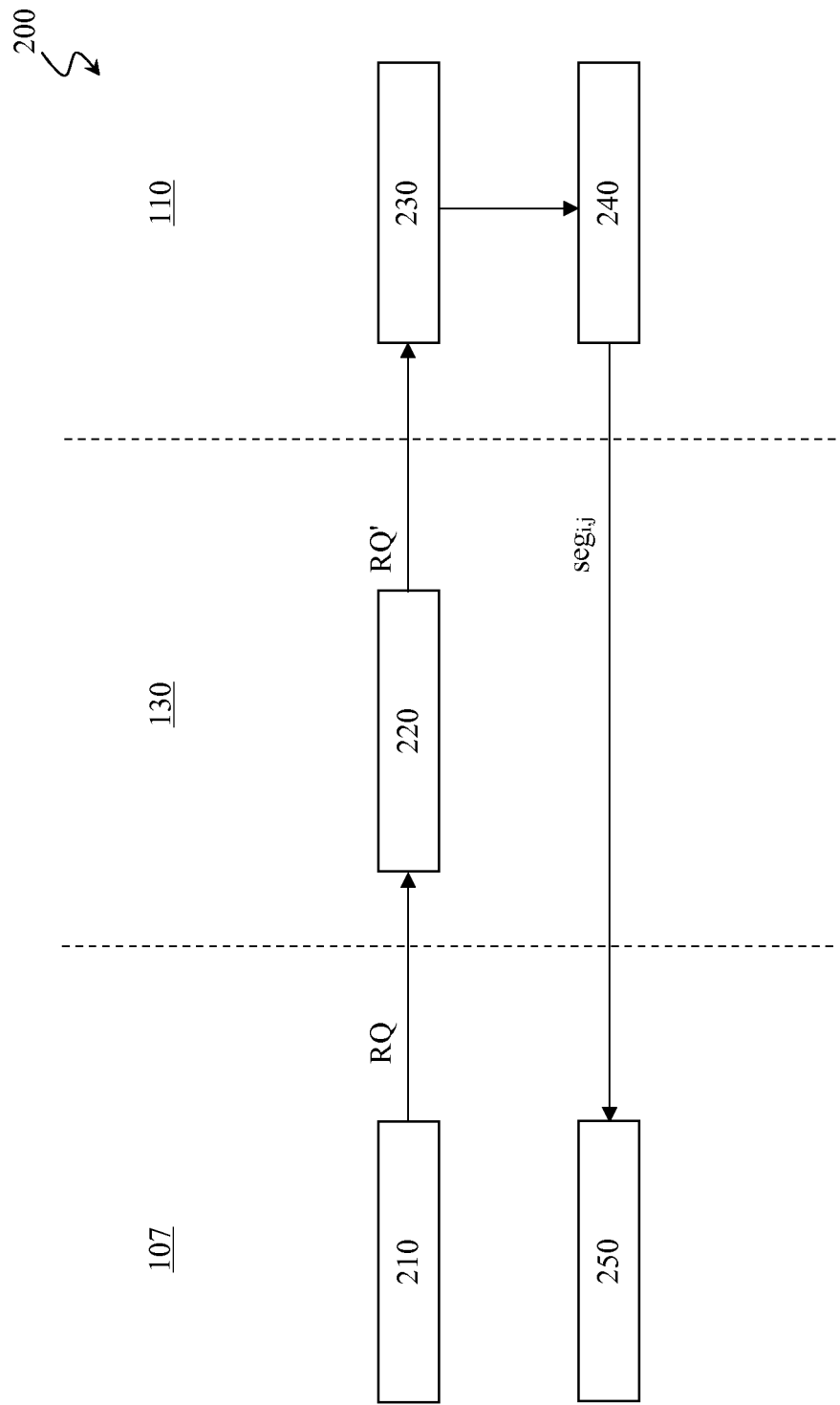
FIG. 2 is a simplified activity diagram showing how the client, the content server and a proxy server interact to each other during an optimization procedure according to an embodiment of the present invention.

With reference to the drawings, FIG. 1A is a principle schematic of a (generic) wireless communication network 100 in which a user equipment 105—on which runs a client software application 107—connects to a content server 110 (e.g., a multimedia server) for requesting a streaming service.

The wireless communication network 100 allows and manages communications of user equipment (e.g., mobile telephones, smartphones, personal computers and tablets) such as the user equipment 105 on which runs the client 107 over a geographical coverage area 112 by means of one or more radio communication stations, such as the radio communication station 115. For example, the wireless communication network 100 is a 3GPP Long Term Evolution (LTE)/LTE Advanced (LTE-A) mobile telephony network comprising a plurality of radio communication stations 115 (evolved Node B) adapted to manage communications (i.e., transmission and/or reception of information, such as binary data packets) within the geographical coverage area 112.

The content server 110 is a remote entity that is connected to the wireless communication network 100 by means of an external communication network 120, for example Internet.

The content server 110 is configured to provide streaming services of multimedia contents, such as video clips, television content, music, Internet radio, to the clients 107 running on one or more user equipment, such as the user equipment 105 through the radio communication station 115. In other words, the content server 110 is adapted to deliver a (stored or temporarily stored) multimedia content MC (e.g., a multimedia file, such as a video record) to the client 107 running on the user equipment 105 in such a way that the multimedia content MC is directly enjoyable by means of the client 107 substantially from the start of the multimedia content MC delivery.

The multimedia content MC is scalable in the sense explained in the introductory part of the present description. In an embodiment of the invention, the content server 110 is configured to implement the MPEG-DASH standard. As discussed in the introductory part of the present description, according to the MPEG-DASH standard the multimedia content MC is subdivided in a plurality of multimedia content chunks or, simply, chunks $ck_i$ ($1 \le i \le I$, wherein I is a positive integer) of fixed or variable (from chunk to chunk) length. Each chunk $ck_i$ is associated with a plurality of multimedia content segments or, simply, segments $seg_{i,j}$ ($1 \le j \le J$, wherein J is a positive integer) available at the content server 110. Each segment $seg_{i,j}$ of a same chunk $ck_i$ comprises the same portion of the multimedia content MC but each one of the segments $seg_{i,j}$ is a version of the multimedia content MC portion (i.e., the chunk $ck_i$) which is encoded with a specific encoding quality, such as for example an encoding bit rate $br_{i,j}$ (therefore, different segments have a different size, expressed in number of bits, one from the other). In the example, each segment $seg_{i,j}$ corresponding to a same chunk $ck_i$ is a corresponding version thereof encoded with a specific encoding bit rate $br_{i,j}$. Advantageously, the encoding bit rates $br_{i,j}$ are arranged in an ordered sequence according to the index j. For example, the higher the value of the index j, the higher the encoding bit rate $br_{i,j}$ (and therefore, the higher the quality of the corresponding segments $seg_{i,j}$).

A list of chunks $ck_i$, segments $seg_{i,j}$ and their location inside the content server 110 (e.g., expressed by means of respective URLs), bit rates $br_{i,j}$, and possibly other parameters associated with the multimedia content (such as starting time and duration of the segment, resolution, codec name, and so on) are organized according to a so-called Media Presentation Description (MPD) file (referred to the multimedia content MC) stored into the content server 110.

In order to enjoy a (desired) streaming service, i.e., the delivery of the (desired) multimedia content MC from the content server 110 to the client 107, the client 107 has first to obtain the MPD file associated with the multimedia content MC. The MPD file can be delivered by the content server 110 to the client 107 by using HTTP, e-mail, or by similar data transmission mechanisms. Once the client 107 has obtained the MPD file, the client 107 can send to the content server 110 a request RQ for receiving (i.e., downloading) a segment $seg_{i,j}$ of a chunk $ck_i$ of the multimedia content MC.

In order to properly set the request RQ, the client 107 is configured to run a rate control algorithm enabling the client 107 to identify the most suitable selection of the encoding bit rate of (chunks of) the multimedia content MC to be downloaded from the content server 110, e.g., through the MPEG-DASH standard. For this purpose, the client 107 may estimate an available bandwidth and request the most suitable segment $seg_{i,j}$ (in terms of number of bits) of the chunk $ck_i$ based on such estimation.

For example, a bandwidth indication can be carried out by measuring the amount of data received during a previous observation time interval, such as for example the amount of data received with the downloading of a segment $seg_{i,j}$ of a previous chunk $ck_i$, as depicted in the exemplary rate control algorithm flow chart illustrated in FIG. 1B.

Making reference to FIG. 1B, when the client 107 receives a segment $seg_{i,j}$—having a bit rate $br_{i,j}$—of a chunk cki from the content server 110 (block 135), the client 107 measures the corresponding amount of data actually received (block 138) during the download of such segment $seg_{i,j}$. This measurement provides an indication of the amount of bandwidth bw which has been actually assigned to the user equipment 105 on which runs the client 107.

At this point, the client 107 compares such indication of the amount of bandwidth bw with the bit rate $br_{i,j}$ of the received segment $seg_{i,j}$ (block 140).

If the indication of the amount of bandwidth bw is lower than the bit rate $br_{i,j}$ (exit branch Y of block 140) it means that the available bandwidth assigned to the user equipment 105 is not sufficient for the transmission of segments $seg_{i,j}$ having such bit rate $br_{i,j}$. Therefore, for the next request RQ of a next chunk $ck_{i+1}$, the client 107 will select a segment $seg_{i+1,j}$ having a bit rate $br_{i+1,j}$ lower than the bit rate $br_{i,j}$ (block 145, then returning back to block 138).

If instead the indication of the amount of bandwidth bw is equal to or higher than the bit rate $br_{i,j}$ (exit branch N of block 140) it means that the available bandwidth assigned to the user equipment 105 is sufficient for the transmission of segments $seg_{i,j}$ having such bit rate $br_{i,j}$. Therefore, for the next request RQ of a next chunk $ck_{i+1}$, the client 107 will select a segment $seg_{i+1,j}$ having a bit rate $br_{i+1,j}$ equal to or higher than the bit rate $br_{i,j}$ (block 150, then returning back to block 138).

More in general, the rate control algorithm may advantageously exploit a cross-layer approach in which entities of multiple levels of the OSI protocol stack layer of the wireless communication network 100 interact with one another in order to identify the most suitable selection of segments $seg_{i,j}$ of each chunk $ck_i$ of the multimedia content MC to be provided by the content server 110 to the client 107, such as for example the rate control algorithm disclosed in the International patent application WO 2016/102001. In this case, the selection of the most suitable segments $seg_{i,j}$ to be downloaded is done by taking into account many measurements, that include the assigned bandwidth, the estimated channel quality, the amount of packet lost (generally referred to as packet loss ratio).

According to an embodiment of the present invention, the bandwidth usage in the coverage area 112 directed to provide multimedia content MC to the client 107 can be advantageously optimized by modifying the request RQ coming from the client 107 by taking into consideration that the QoS of the delivering of a multimedia content MC portion having a low complexity—i.e., a low amount of information content—is very scarcely affected if such portion is encoded and delivered with a lowered bit rate. Indeed, the lower the complexity of a multimedia content MC portion, the lower the influence of a bit rate reduction on the QoS. Delivering a multimedia content MC portion having a low complexity (such as for example comprising a sequence of still frames and/or comprising very few content objects) with a high bit rate is a waste of bandwidth, since a same QoS could be achieved with a lower bit rate.

According to an embodiment of the present invention, the complexity—i.e., the amount of information content—of a multimedia content MC chunk $ck_i$ can be assessed by taking into consideration how the video quality of the corresponding segments $seg_{i,j}$ vary as the bit rate $br_{i,j}$ varies. In order to quantify the video quality of a segment $seg_{i,j}$, several objective metric can be employed, as described in the following.

Given a segment $seg_{i,j}$ corresponding to a chunk $ck_i$ and encoded with an encoding bit rate $br_{i,j}$, the lowest the encoding bit rate $br_{i,j}$, the higher the quality degradation caused by the loss of information introduced by video compression. Different objective metrics can be used to quantify the effective video quality experienced by end users after the encoding process, such as, for instance, the average Peak signal-to-noise ratio (PSNR), the average structural similarity (SSIM), and the average Perceptual Evaluation of Video Quality (PEVQ). Therefore, to each segment $seg_{i,j}$ corresponding to a chunk $ck_i$ and encoded with a specific encoding bit rate $br_{i,j}$, it is possible to calculate a corresponding objective metric describing the video quality of the segment $seg_{i,j}$. When the complexity of a chunk $ck_i$ is low, an increment of the encoding bit rate does not bring to a real increment of the objective metric (e.g., the PSNR) that describes the video quality experienced by the end user. For example, having two segments $seg_{i,n}$ and $seg_{i,m}$ (with $1 \leq n \leq J$ and $1 \leq m \leq J$) corresponding to a same chunk $ck_i$ and encoded with encoding bit rates $br_{i,n}$ and $br_{i,m}$, respectively, if the complexity (information content) of the chunk $ck_i$ is low, the value of the PSNR of the segment $seg_{i,m}$,—i.e., PSNR $(seg_{i,m})$—can be very close to the value of the PSNR of the segment $seg_{i,n}$—i.e., PSNR $(seg_{i,n})$—, even if $br_{i,m}$ is not negligibly higher than $br_{i,n}$.

Thus, according to an embodiment of the present invention, bandwidth consumption can be reduced without reaching an unsatisfactory video quality degradation by exploiting video quality information provided by objective metrics to optimally select which segment $seg_{i,j}$ of a chunk $ck_i$ has to be downloaded.

In view of the above, according to an embodiment of the present invention, a proxy server 130, also referred to as proxy DASH server, is hosted at the radio communication station 115 to perform an optimization procedure directed to intercept and process the request RQ generated by the client 107, in order to provide a corresponding optimized request RQ' to the content server 110 in place of the request RQ to optimize the bandwidth usage with a very reduced QoS decreasing.

As described in detail in the following, according to an embodiment of the present invention, such optimized request RQ' is generated based on the amount of information content of the segments $seg_{i,j}$ of the chunks $ck_i$ of the multimedia content MC.

Turning now to FIG. 2, a simplified activity diagram 200 is illustrated, which shows how the client 107, the content server 110 and the proxy server 130 interact to each other during the optimization procedure according to an embodiment of the present invention.

At block 210, the client 107 sends a request RQ to the content server 110. The request RQ comprises, for the generic chunk $ck_i$ (i=1 to I) of the group of chunks $ck_i$ forming the multimedia content MC, the request of a segment $seg_{i,j}$ (encoded with a specific encoding bit rate $br_{i,j}$) selected among the available J corresponding segments $seg_{i,j}$ (j=1 to J) associated to such chunk $ck_i$. Hereinafter, the index j of the generic segment provided in the request RQ will be identified by means of underlying (e.g., j_), so that the generic segment provided in the request RQ corresponding to the generic i-th chunk $ck_i$. is identified as $seg_{i,j}$ and its encoding bit rate is identified as $br_{i,j}$.

Figure 3:
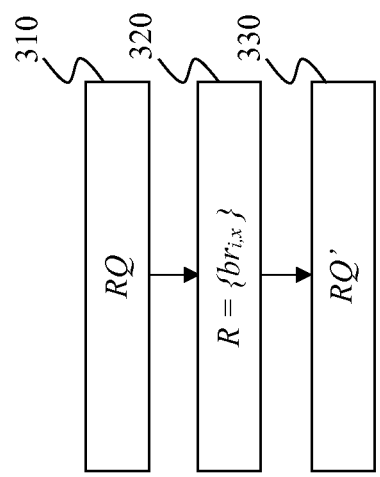
FIG. 3 is a flow chart illustrating the main operations carried out by the proxy server of FIG. 2 for generating an optimized request of multimedia content segments according to an embodiment of the present invention.

At block 220, the proxy server 130 intercepts the request RQ and generates a corresponding optimized request RQ' by carrying out the operations illustrated by means of the flow chart of FIG. 3.

The proxy server 130 identifies (block 310) the segment $seg_{i,j}$ corresponding to the chunk $ck_i$ provided in the request RQ. Such segment $seg_{i,j}$ is a version of the chunk $ck_i$ encoded with the encoding bit rate $br_{i,j}$, i.e., it is the j-th segment among the J corresponding segments $seg_{i,j}$ (j=1 to J) associated to such chunk $ck_i$ available at the content server 110.

Based on the information provided in the MPD file, the proxy server 130 inspects the various segments $seg_{i,j}$ corresponding to the chunk $ck_i$ and selects (block 320) a group $R=\{br_{i,x}\}$, $x=j-n, j-(n-1), \ldots j-1, j$ (wherein n is a positive integer) of encoding bit rates $br_{i,j}$ comprising encoding bit rates $br_{i,j}$ which satisfy the following relationship:

$$PSNR(seg_{i,j})-PSNR(seg_{i,x}) \le TH,$$

wherein $PSNR(seg_{i,j})$ is the PSNR (e.g., expressed in decibel) of the j-th segment $seg_{i,j}$ corresponding to the chunk $ck_i$ encoded with the encoding bit rate $br_{i,j}$, and TH (e.g., expressed in decibel) is a threshold that represents a maximum tolerated quality degradation introduced by selecting the segment $seg_{i,x}$ in place of the segment $seg_{i,j}$ provided by the request RQ. Similar considerations apply if in the above relationship, objective metrics different than the PSNR are used to quantify the effective video quality experienced by end users after the encoding process, such as, for instance, the SSIM or the PEVQ.

Then (block 330), the proxy server 130 sets the optimized request RQ' by replacing the segment $seg_{i,j}$ corresponding to the chunk $ck_i$ provided in the request RQ with segment $seg_{i,j=x'}$ for which its corresponding encoding bit rate $br_{i,j=x'}$ is the lowest among the ones belonging to R. If R comprises the encoding bit rate $br_{i,j}$ only, i.e., if no other than the segment $seg_{i,j}$ provided in the request RQ is such to introduce a quality degradation lower than TH, such segment $seg_{i,j}$ is maintained.

These operations can be reiterated for any other chunk $ck_i$ of the multimedia content MC:

In other words, according to an embodiment of the present invention, for the generic chunk $ck_i$, the proxy server 130 selects the segment $seg_{i,j}$ having the lowest encoding bit rate $br_{i,j}$ among the segments $seg_{i,j}$ for which the quality degradation introduced by selecting them in spite of the segment $seg_{i,j}$ provided by the original request RQ is lower than a maximum threshold TH.

Turning back to FIG. 2 the proxy server 130 sends the optimized request RQ' to the content server 110, so that at block 230 the content server 110 receives this latter request in place of the request RQ originally sent by the client 107.

At block 240, the content server transmits the segment $seg_{i,j}$ indicated in the optimized request RQ', which is received by the client 107 at block 250.

According to an embodiment of the invention, the optimization procedure is implemented within a functional module or entity that is provided at the application layer of the OSI protocol stack.

According to an embodiment of the present invention, an indication of the amount of information content (e.g., the PSNR) of the segments $seg_{i,j}$ of the chunks $ck_i$ is advantageously listed in the MPD file, so that the proxy server 130 can easily obtain them without having to carry out additional calculations.

Making reference to the case in which the amount of information content is quantified by means of the PSNR, exemplary values for the threshold TH may range from 1 dB to 10 dB. According to another embodiment, in which the amount of information content is quantified by means of the SSIM, values for the threshold TH range from 0 to 1, In any case, the higher the value of the threshold TH, the higher the impact of the optimization procedure on the degradation of the quality level experienced by the user of the user equipment 105. Moreover, the higher the value of the threshold TH, the lower the average traffic load generated by multimedia content MC flows in the radio access interface of the wireless communication network 100. The higher the value of the threshold TH, the higher the goodput experienced by other multimedia content MC flows managed in the same coverage area 112.

For instance, a simulation study carried out by considering an LTE network and the following main simulation parameters:

Urban macro cell scenario with 19 cell sites, 1 sector per site, and cell radius set to 250 m, 5 MHz of bandwidth, SIMO 1×2 physical interface, A number of 2-10 users moving at 3 km/h and receiving video and best effort flows, A real video trace (resolution equal to 680×360 and frame rate set to 25 fps) encoded with an average bitrate in the 143 kbps-653 kbps range, Information content quantified by means of PSNR metric, demonstrated that a threshold TH=4 dB guarantees good performance.

As already mentioned above, thanks to the proposed solution, the bandwidth usage in the coverage area 112 can be advantageously optimized.

Another advantage provided by the present solution is that this bandwidth optimization can be carried out under the control of the operator of the wireless communication network 100, since the optimization procedure is performed by the proxy server 130, which is implemented at the radio communication station 115, which is in turn controlled by the operator of the wireless communication network 100. In this way, instead of acting as a passive carrier of multimedia content MC only, the operator of the wireless communication network 100 may directly participate with the provisioning of multimedia content MC directly controlling and optimizing the overall QoS reachable in the coverage area 112, such as for example by setting the value of the threshold TH, and/or by dynamically adapt it based on the actual traffic load condition.

In order to increase the operation efficiency, the client 107 should be advantageously aware of the possibility that its requests RQ can be modified by the proxy server 130.

Indeed, typical rate control algorithms which may be implemented by the client 107, such as the one previously described by making reference to FIG. 1B, are usually designed to select segments $seg_{i,j}$ corresponding to lower bit rates $br_{i,j}$ as soon as a reduction of bandwidth is observed in the wireless link. The optimization procedure according to the present invention usually causes a reduction of the amount of bandwidth assigned to the user equipment in the wireless link. However, this reduction should be interpreted by the client 107 as a result of the optimization procedure—which does not produce a real impairment of the QoS—and not as a consequence of a congestion episode.

In order to solve this drawback, according to an exemplary embodiment of the present invention, the rate control algorithm of FIG. 1B is properly modified as shown in the flow chart illustrated in FIG. 4, in which blocks that are the same as those shown in FIG. 1B are given the same reference numbers, and their explanation is omitted for the sake of conciseness. Specifically, in order to avoid that the client 107 selects a segment $seg_{i,j}$ having a lower encoding bit rate $br_{i,j}$ even if there is enough available bandwidth to satisfy the request of a higher encoding bit rate $br_{i,j}$, the decrement of the encoding bit rate $br_{i,j}$ can be advantageously performed only if the instantaneous packet loss ratio plr is not null. For this reason, in addition to the bandwidth measurement, during the download of the segment $seg_{i,j}$ the client 107 measures also the packet loss ratio plr of such download (block 410). Then (block 420), for the next chunk $ck_{i+1}$, the client 107 selects a segment $seg_{i+1}$ having an encoding bit rate $br_{i+1,j}$ lower than the bit rate $br_{i,j}$ of the previous chunk $ck_i$ only if the indication of the amount of bandwidth bw is lower than the bit rate $br_{i,j}$, and at the same time the packet loss ratio plr has been assessed to be higher than zero.

These modifications can be easily integrated in any rate control algorithm implementation, such as for example the one disclosed in the International patent application WO 2016/102001.

According to an embodiment of the present invention, better results can be achieved if the segments $seg_{i,j}$ of each chunk $ck_i$ stored in the content server 110 are such to be equidistant to each other in term of quality level, instead of encoding bit rate. For example, the quality level of a segment $seg_{i,j}$ can be calculated with the Mean Opinion Score (MOS) index described in the ITU-T G107 specification. According to an exemplary embodiment of the present invention, the segments $seg_{i,j}$ of a chunk $ck_i$ are advantageously stored with encoding bit rates $br_{i,j}$ such to ensure a set of quality levels that are uniformly distributed between MOS=3 and MOS=5.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-Advanced standard, it should be understood that it is not in the intentions of the Applicant to be limited to the implementation of any particular wireless communication system architecture or protocol (e.g., Wi-Fi). In this respect, it is also possible to provide that, with suitable simple modifications, the proposed solution may be applied also to other cellular networks, such as the view forthcoming 5G (and beyond) cellular networks.

Moreover, even if in the description reference has been made to a particular rate control algorithm implemented at the client, the concepts of the present invention directly apply in case different rate control algorithm are used.

Furthermore, even if in the description reference has been made to segments $seg_{i,j}$ whose encoding bit rates $br_{i,j}$ are arranged in a specific ordered sequence according to the index j, similar considerations apply if different sequences are used. For example, the lower the value of the index j, the higher the encoding bit rate $br_{i,j}$.

The invention claimed is:

1. A method of downloading a multimedia content from a content server to a client through a wireless communication network, the multimedia content being subdivided into a plurality of chunks and for each chunk the content server having at least two corresponding versions thereof encoded with different encoding rates, the method comprising:
   having the client send a first request of a first version of a corresponding requested chunk;
   having a proxy server, included in a radio communication station of the wireless communication network, intercept said first request to generate a second request of a second version of the requested chunk;
   having the proxy server send the second request to the content server in place of said first request; and
   having the content server send the second version to the client,
   wherein said second request is generated based on an amount of information content of the versions of said requested chunk, and
   wherein the versions of a chunk stored in the content server are encoded with encoding rates that cause such versions to have quality levels uniformly distributed between a first MOS index and a second MOS index.

2. The method of claim 1, further comprising generating said second request by carrying out the following sequence of operations:
   selecting a collection of encoding rates among the encoding rates of the versions of said requested chunk which are stored in the content server, each encoding rate of the selected collection being such that the difference between:
   a) a video quality of the first version, and
   b) a video quality of the version of the requested chunk encoded with said encoding rate of the selected collection,
   is lower than a threshold;
   selecting a lowest encoding rate among the encoding rates of the collection, and
   selecting the version of the requested chunk encoded with said selected lowest encoding rate as the second version.

3. The method of claim 2, wherein said threshold corresponds to a maximum tolerated quality degradation introduced by using the second version in place of the corresponding first version.

4. The method of claim 3, wherein said video quality of a version of a chunk is assessed by exploiting one among the following objective metrics:
   the a peak signal-to noise ratio;
   the an average structural similarity, and
   perceptual evaluation of video quality.

5. The method of claim 4, wherein said video quality of a version of a chunk is assessed by exploiting the peak signal-to noise ratio and said threshold has a value that ranges from 1 dB to 10 dB.

6. The method of claim 2, further comprising dynamically adapting the value of the threshold based on an actual traffic load condition of the wireless communication network.

7. The method of claim 1, wherein said having the client send a first request of a first version of a corresponding requested chunk comprises:
    having the client measure the amount of data received in response to the reception of a version of a previous chunk;
    having the client measure a packet loss ratio of such reception;
    having the client select such first version based on said measured amount of data and based on said measured packet loss ratio.

8. The method of claim 7, wherein said having the client select such first version based on said measured amount of data and based on said measured packet loss ratio comprises:
    if the measured amount of data is lower than the encoding rate of said version of a previous chunk, and, at the same time, if the measured packet loss ratio is higher than zero:
        selecting said first version in such a way that said first version is a version of the requested chunk which is encoded with an encoding rate lower than the encoding rate of said version of a previous chunk,
    if the measured amount of data is equal to or higher than the encoding rate of said version of a previous chunk, or if the measured packet loss ratio is equal to or lower than zero:
        selecting said first version in such a way that said first version is a version of the requested chunk which is encoded with an encoding rate equal to or higher than the encoding rate of said version of a previous chunk.

9. A wireless communication network comprising:
    a user equipment on which runs a client;
    at least one radio communication station configured to manage wireless communication between said client and a content server for downloading a multimedia content, said multimedia content being subdivided into a plurality of chunks and for each chunk the content server having at least two corresponding versions thereof encoded with different encoding rates, wherein:
    the client is configured to send a first request of a first version of a corresponding requested chunk;
    the at least one radio communication station includes a proxy server configured to intercept said first request to generate a second request of a second version of the requested chunk, and configured to send such second request to the content server in place of said first request;
    the content server is configured to send the second version to the client,
    wherein said second request is generated based on an amount of information content of the versions of said requested chunk, and
    wherein the versions of a chunk stored in the content server are encoded with encoding rates that cause such versions to have quality levels uniformly distributed between a first MOS index and a second MOS index.

10. The wireless communication network of claim 9, wherein the proxy server is configured to generate said second request by carrying out the following sequence of operations:
    selecting a collection of encoding rates among the encoding rates of the versions of said requested chunk which are stored in the content server, each encoding rate of the selected collection being such that the difference between:
        a) a video quality of the first version, and
        b) a video quality of the version of the requested chunk encoded with said encoding rate of the selected collection,
    is lower than a threshold;
    selecting a lowest encoding rate among the encoding rates of the collection, and
    selecting the version of the requested chunk encoded with said selected lowest encoding rate as the second version.

11. A proxy server included in a radio communication station of a wireless communication network, the radio communication station being configured to manage wireless communication between a client running on a user equipment and a content server for downloading a multimedia content, said multimedia content being subdivided into a plurality of chunks and for each chunk the content server having at least two corresponding versions thereof encoded with different encoding rates, the proxy server being configured to:
    intercept a first request coming from the client and directed to the content server, such first request being a request of a first version of a corresponding requested chunk;
    generate a second request of a second version of the requested chunk;
    send such second request to the content server in place of said first request,
    wherein said second request is generated based on an amount of information content of the versions of said requested chunk, and
    wherein the versions of a chunk stored in the content server are encoded with encoding rates that cause such versions to have quality levels uniformly distributed between a first MOS index and a second MOS index.

* * * * *